US009499351B2

(12) United States Patent
Momose et al.

(10) Patent No.: US 9,499,351 B2
(45) Date of Patent: Nov. 22, 2016

(54) LIQUID DISCHARGING APPARATUS

(71) Applicant: SEIKO EPSON CORPORATION, Tokyo (JP)

(72) Inventors: Seigo Momose, Nagano (JP); Hiroyuki Kobayashi, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 109 days.

(21) Appl. No.: 14/220,295

(22) Filed: Mar. 20, 2014

(65) Prior Publication Data
US 2014/0284178 A1 Sep. 25, 2014

(30) Foreign Application Priority Data

Mar. 22, 2013 (JP) ................................. 2013-059604

(51) Int. Cl.
| B65G 45/10 | (2006.01) |
| B41J 11/00 | (2006.01) |
| B41J 29/17 | (2006.01) |
| B41J 3/407 | (2006.01) |

(52) U.S. Cl.
CPC .............. B65G 45/10 (2013.01); B41J 3/4078 (2013.01); B41J 11/007 (2013.01); B41J 29/17 (2013.01)

(58) Field of Classification Search
CPC .................................................... B65G 45/10
USPC .................. 198/494, 498; 15/256.5, 256.51; 399/327; 347/33
See application file for complete search history.

(56) References Cited

U.S. PATENT DOCUMENTS

| 7,225,915 | B2 * | 6/2007 | Kelly | ..................... | B65G 45/24 198/494 |
| 8,229,316 | B2 * | 7/2012 | Park | ..................... | G03G 15/161 198/499 |
| 8,534,793 | B2 * | 9/2013 | Shinoda | ............... | B41J 2/16552 347/29 |
| 2008/0107461 | A1 * | 5/2008 | Miyata | ................... | B41J 11/007 399/343 |
| 2009/0185818 | A1 * | 7/2009 | Saka | ..................... | G03G 15/11 399/101 |

FOREIGN PATENT DOCUMENTS

| JP | 2007-055001 A | 3/2007 |
| JP | 5303252 B2 * | 10/2013 |

* cited by examiner

Primary Examiner — Timothy Waggoner
Assistant Examiner — Lester Rushin
(74) Attorney, Agent, or Firm — Global IP Counselors, LLP

(57) ABSTRACT

A liquid discharging apparatus includes a transporting endless belt, a discharging head and a cleaning mechanism. The transporting endless belt has an adhesive support surface, and configured and arranged to intermittently transport a medium by supporting the medium on the adhesive support surface. The discharging head is configured and arranged to discharge a liquid onto the medium supported by the transporting endless belt. The cleaning mechanism has a cleaning roller configured and arranged to clean the transporting endless belt by coming into contact with the transporting endless belt. When a total length of the transporting endless belt is L1, an intermittent transport distance of the transporting endless belt is L2, and a contact length of the cleaning roller with the transporting endless belt in a transport direction is L3, L3 is longer than L2, and L1 is a non-integer multiple of L2.

14 Claims, 8 Drawing Sheets

LIQUID DISCHARGING APPARATUS

CROSS-REFERENCE TO RELATED APPLICATIONS

This application claims priority to Japanese Patent Application No. 2013-059604 filed on Mar. 22, 2013. The entire disclosure of Japanese Patent Application No. 2013-059604 is hereby incorporated herein by reference.

BACKGROUND

1. Technical Field

The present invention relates to a liquid discharging apparatus such as an ink jet recording apparatus which is provided with a transporting endless belt which is able to intermittently transport a medium by supporting the medium on an adhesive support surface, a discharging head which discharges a liquid such as ink onto the medium, and a cleaning mechanism which has a cleaning roller which cleans by coming into contact with the transporting endless belt.

2. Related Art

Examples of this type of liquid discharging apparatus include an ink jet recording apparatus which is described in Japanese Unexamined Patent Application Publication No. 2007-55001.

Japanese Unexamined Patent Application Publication No. 2007-55001 discloses a structure where all portions within a feeding width of one cycle of the transport belt which performs intermittent transporting are abutted against a belt cleaning roller when the transport belt stops by increasing a nip width of the transport belt in the rotational direction where the belt cleaning roller and the transport belt abut against each other to be more than the feeding width of one cycle of the transport belt. It is also described that, due to this structure, it is possible to efficiently perform cleaning of ink which is attached to the transport belt which intermittently transports a recording medium without uneven cleaning with a simple configuration.

SUMMARY

However, Japanese Unexamined Patent Application Publication No. 2007-55001 does not describe a relationship between the nip width and the total length of the transport belt. When the relationship is simply that the nip width is larger than the feeding width of one cycle, there is a concern that there will be locations with a high frequency of cleaning on the transport belt surface due to continuing cleaning using the cleaning roller. This concern will be described based on the diagrams (A) to (D) in FIG. 8.

In FIG. 8(A), the reference numeral 10 indicates the transporting endless belt and the reference numeral 13 indicates the cleaning roller. The cleaning roller 13 comes into contact with an adhesive support surface F of the transporting endless belt 10 over a contact length L3 in the direction of transport according to the transporting endless belt 10. In the same diagrams, the reference numeral L2 indicates the intermittent transport distance of the transporting endless belt 10, that is, the feeding amount per cycle. The contact length L3 is longer than the intermittent transport distance L2.

FIG. 8(B) illustrates a state where one cycle of intermittent transporting is performed from the state in FIG. 8(A). It is not possible for the region which is indicated by the reference numeral 21 to pass through the range of the contact length L3 in one cycle of intermittent transporting. As a result, cleaning of a portion which corresponds to the region 21 on the adhesive support surface F of the transporting endless belt 10 by the cleaning roller 13 is performed twice when passing through the cleaning region (the range of the contact length L3).

FIG. 8(C) illustrates a state where, in a case of a relationship where the total length of the transporting endless belt 10 is an integer multiple of the intermittent transport distance L2, the transporting endless belt 10 is rotated once (moving the total length) from the position in FIG. 8(A). In a case of such a relationship, the positional relationship of the adhesive support surface F of the transporting endless belt 10 with the portion which corresponds to the cleaning region (the contact length L3) of the cleaning roller 13 does not change even with one rotation. That is, the positional relationship is the same as in FIG. 8(A).

FIG. 8(D) illustrates a state where intermittent transporting is performed once from the state in FIG. 8(C) and this state is the same positional relationship as FIG. 8(B).

As is understood from the description above, the frequency with which the region 21 is cleaned is higher than the other regions.

Cleaning of the transporting endless belt 10 using the cleaning roller 13 is performed in order to remove dirt such as ink, foreign matter, or the like which are attached to the adhesive support surface of the transporting endless belt 10, but the adhesive on the surface is also peeled off little by little along with the dirt at this time.

In the region 21 with a high frequency of cleaning, the peeling of the adhesive is more severe than in the other portions. As a result, the degree of reduction in the adhesive of the region 21 with a high frequency of cleaning is biased to be larger than the other portions due to cleaning being repeated and as a result there are problems in that the adhesive on the adhesive support surface is non-uniform, it is necessary to re-apply the adhesive sooner, and there is a burden on a user.

Japanese Unexamined Patent Application Publication No. 2007-55001 does not describe or suggest the problem of bias in the frequency of cleaning.

An object of the present invention is to suppress a high frequency of cleaning at specific locations on an adhesive support surface in a liquid discharging apparatus with a configuration where a transporting endless belt which has the adhesive support surface is cleaned by a cleaning roller.

A liquid discharging apparatus according to a first aspect includes a transporting endless belt, a discharging head and a cleaning mechanism. The transporting endless belt has an adhesive support surface, and configured and arranged to intermittently transport a medium by supporting the medium on the adhesive support surface. The discharging head is configured and arranged to discharge a liquid onto the medium supported by the transporting endless belt. The cleaning mechanism has a cleaning roller configured and arranged to clean the transporting endless belt by coming into contact with the transporting endless belt. When a total length of the transporting endless belt is L1, an intermittent transport distance of the transporting endless belt is L2, and a contact length of the cleaning roller with the transporting endless belt in a transport direction is L3, L3 is longer than L2, and L1 is a non-integer multiple of L2.

According to the present aspect, since the contact length L3 is longer than the intermittent transport distance L2 and the total length L1 of the transporting endless belt is a non-integer multiple of the intermittent transport distance L2, there are no locations with cleaning omissions and it is possible to disperse locations with a high frequency of cleaning over the entire circumference of the transporting endless belt 10 due to the non-integer multiple relationship. That is, in the liquid discharging apparatus with a configuration where the transporting endless belt which has the adhesive support surface is cleaned by the cleaning roller, it is possible to suppress a high frequency of cleaning at specific locations on the adhesive support surface.

Due to this, the frequency of re-applying the adhesive on the adhesive support surface is reduced and it is possible to reduce the burden on the user.

A liquid discharging apparatus according to a second aspect includes a transporting endless belt, a discharging head and a cleaning mechanism. The transporting endless belt has an adhesive support surface, and configured and arranged to intermittently transport a medium by supporting the medium on the adhesive support surface. The discharging head is configured and arranged to discharge a liquid onto the medium supported by the transporting endless belt. The cleaning mechanism has a cleaning roller configured and arranged to clean the transporting endless belt by coming into contact with the transporting endless belt. When an intermittent transport distance of the transporting endless belt is L2, and a contact length of the cleaning roller with the transporting endless belt in a transport direction is L3, L3 is longer than L2. The cleaning mechanism is configured and arranged to displace a contact position of the cleaning roller which comes into contact with the transporting endless belt in the transport direction.

According to the present aspect, since the contact length L3 is longer than the intermittent transport distance L2, and it is possible to displace the position of the cleaning roller which comes into contact with the transporting endless belt in the direction of transport, there are no locations with cleaning omissions and it is possible to disperse locations with a high frequency of cleaning over the entire circumference of the transporting endless belt by performing displacement. That is, in the liquid discharging apparatus with a configuration where the transporting endless belt which has the adhesive support surface is cleaned by the cleaning roller, it is possible to suppress a high frequency of cleaning at specific locations on the adhesive support surface.

Due to this, the frequency of re-applying the adhesive on the adhesive support surface is reduced and it is possible to reduce the burden on the user.

A liquid discharging apparatus according to a third aspect includes a transporting endless belt, a discharging head and a cleaning mechanism. The transporting endless belt has an adhesive support surface, and configured and arranged to intermittently transport a medium by supporting the medium on the adhesive support surface. The discharging head is configured and arranged to discharge a liquid onto the medium supported by the transporting endless belt. The cleaning mechanism has a cleaning roller configured and arranged to clean the transporting endless belt by coming into contact with the transporting endless belt. when a total length of the transporting endless belt is L1, an intermittent transport distance of the transporting endless belt is L2, and a contact length of the cleaning roller with the transporting endless belt in a transport direction is L3, L3 is longer than L2, and L3 is an integer multiple of L2.

According to the present aspect, since the contact length L3 is longer than the intermittent transport distance L2 and the contact length L3 is an integer multiple of the intermittent transport distance L2, there are no locations with cleaning omissions and it is possible to disperse locations with a high frequency of cleaning over the entire circumference of the transporting endless belt due to the integer multiple relationship. That is, in the liquid discharging apparatus with a configuration where the transporting endless belt which has the adhesive support surface is cleaned by the cleaning roller, it is possible to suppress a high frequency of cleaning at specific locations on the adhesive support surface.

Due to this, the frequency of re-applying the adhesive on the adhesive support surface is reduced and it is possible to reduce the burden on the user.

A liquid discharging apparatus of a fourth aspect of the present invention is the liquid discharging apparatus of the first aspect where L3 is preferably an integer multiple of L2.

According to the present aspect, since the contact length L3 is an integer multiple of the intermittent transport distance L2, it is even easier to disperse locations with a high frequency of cleaning over the entire circumference of the transporting endless belt in addition to the operations and effects of the first aspect.

A liquid discharging apparatus of a fifth aspect of the present invention is the liquid discharging apparatus of the second aspect, where L3 is preferably an integer multiple of L2.

According to the present aspect, since the contact length L3 is an integer multiple of the intermittent transport distance L2, it is even easier to disperse locations with a high frequency of cleaning over the entire circumference of the transporting endless belt in addition to the operation and effects of the second aspect.

A liquid discharging apparatus of a sixth aspect of the present invention is the liquid discharging apparatus of the second aspect or the fifth aspect, where the contact position is preferably displaced based on transporting endless belt rotation information.

According to the present aspect, the position where the cleaning roller comes into contact with the transporting endless belt is displaced based on transporting endless belt rotation information. Since rotation information such as the number of rotations of the transporting endless belt has a correlation relationship with a high frequency of cleaning, using the rotation information is effective in achieving the object of the present invention. For example, it is possible to effectively perform a contact position displacement operation by setting the displacement operation to be performed every 1 rotation, every 10 rotations, every 50 rotations, every 100 rotations, or the like of the transporting endless belt and by further having a configuration where it is possible for the setting of the number of rotations of the transporting endless belt to be changed. In addition, it is possible to perform displacement operations while eliminating wasteful displacement operations.

Here, it is possible for the "rotation information" to be directly obtained as the number of rotations by providing a rotation measuring section which measures rotations of the transporting endless belt, but the number of rotations may be indirectly determined by calculating the number of rotations of a motor which rotates the transporting endless belt.

A liquid discharging apparatus of a seventh aspect of the present invention is the liquid discharging apparatus of the second aspect or the fifth aspect, where the contact position is preferably displaced with each elapsing of a set time.

According to the present aspect, since the position where the cleaning roller comes into contact with the transporting endless belt is displaced with each elapsing of a set time, it is possible to, for example, effectively perform displacement operations and to eliminate wasteful displacement operations by setting the displacement operation to be performed every 1 hour, every 10 hours, every 1 day, every 2 days, every week, or the like and by further having a configuration where it is possible to set the set time of the displacement operations to be changed.

Here, determining "elapsing of a set time" is performed with high precision by determining using measurement of the elapsing of time using a timing section in a state where the transporting endless belt is being rotated, but determining may be carried out based on the elapsing of time from the time of powering on of the liquid discharging apparatus.

A liquid discharging apparatus of an eighth aspect of the present invention is the liquid discharging apparatus of the second aspect or the fifth aspect, where the contact position is preferably displaced according to inputting of displacement instructions from the user or by a manual operation by the user.

According to the present aspect, it is possible to execute precision displacement which is not uniform. In addition, it is possible to simplify the structure for realizing displacement.

A liquid discharging apparatus of a ninth aspect of the present invention is the liquid discharging apparatus of any one aspect of the first aspect to the eighth aspect, where L3 is preferably longer than a length L4 of a nozzle row of the discharging head in the transport direction.

According to the present aspect, it is possible to disperse locations with a high frequency of cleaning over the entire circumference of the transporting endless belt to easily deal with various liquid discharging modes.

A liquid discharging apparatus of a tenth aspect of the present invention is the liquid discharging apparatus of any one aspect of the first aspect to the ninth aspect, where L3 is preferably variable.

According to the present aspect, it is possible to easily deal with changes even when, for example, the intermittent transport distance L2 of the transporting endless belt changes, and it is possible to easily maintain the configuration where the contact length L3 is longer than the intermittent transport distance L2.

BRIEF DESCRIPTION OF THE DRAWINGS

Referring now to the attached drawings which form a part of this original disclosure.

DETAILED DESCRIPTION OF EXEMPLARY EMBODIMENTS

Embodiment 1 (FIG. 1 to FIG. 3C)

Below, an ink jet recording apparatus will be described in detail as the liquid discharging apparatus according to an embodiment of the present invention with reference to the accompanying diagrams.

Figure 1:
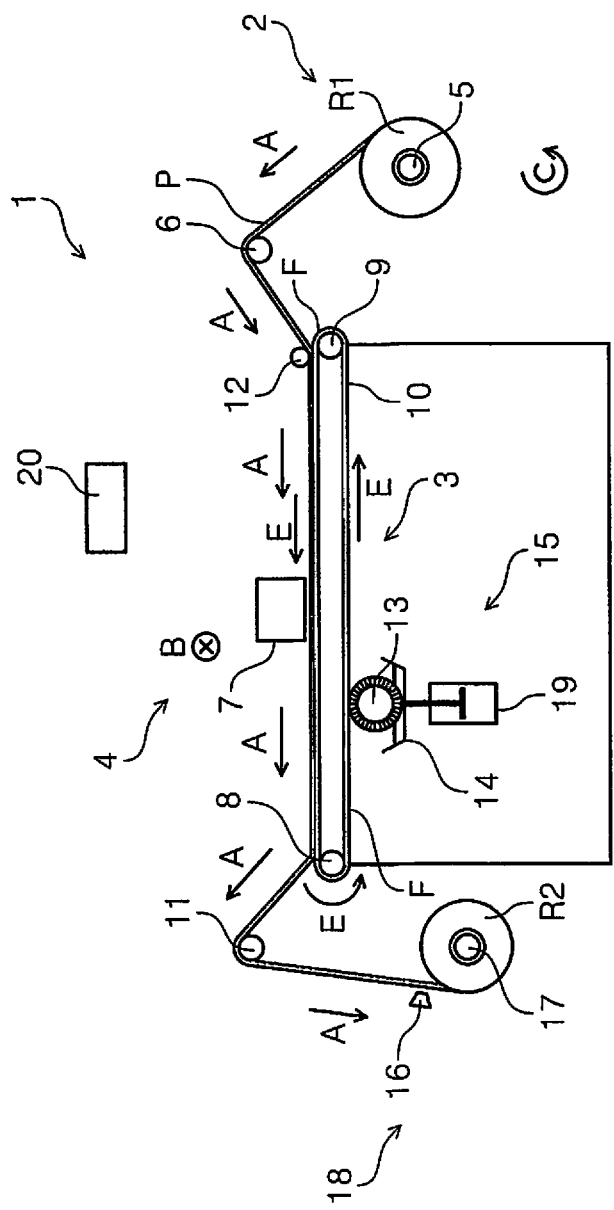
FIG. 1 is a schematic side surface diagram illustrating a liquid discharging apparatus of embodiment 1 of the present invention.

FIG. 1 is a schematic side surface diagram of an ink jet recording apparatus 1 according to embodiment 1 of the present invention.

The ink jet recording apparatus 1 of the present embodiment is provided with a feeding section 2, which is able to feed out a roll R1 of a recording medium P which is formed of a paper medium in roll form in order to perform recording, as an example. In addition, there is provided a transport mechanism 3 which transports the recording medium P in a transport direction A using the transporting endless belt 10 which supports the recording medium P on the adhesive support surface F where an adhesive is attached. In addition, there is provided a recording mechanism 4 which records by moving a recording head 7 which is a discharging head back and forth in a width direction B of the transporting endless belt 10 (which may also be a width direction of the recording medium P) which intersects with the transport direction A of the recording medium P.

In addition, the ink jet recording apparatus 1 of the present embodiment is provided with a cleaning mechanism 15 which performs cleaning of the transporting endless belt 10. Furthermore, there is provided a winding mechanism 18 which has a winding shaft 17 which winds the recording medium P and a cutter 16 which cuts the recording medium P which is wound.

The feeding section 2 has a configuration where a rotating shaft 5 is provided to also be used as a position for setting the roll R1 of the recording medium P in order to perform recording, and where it is possible to feed out the recording medium P from the roll R1 which is set on the rotating shaft 5 to the transport mechanism 3 via a driven roller 6. Here, when feeding out the recording medium P to the transport mechanism 3, the rotating shaft 5 rotates in a rotation direction C.

The transport mechanism 3 is provided with the transporting endless belt 10 which supports and transports the recording medium P which is fed out from the feeding section 2, and a transporting driving roller 8 and a transporting driven roller 9 which move the transporting endless belt 10. The recording medium P is placed on the adhesive support surface F of the transporting endless belt 10 by being pressured and attached using a pressure roller 12 at a position on the upstream side of the transporting endless belt 10 in the transport direction A.

Here, when transporting the recording medium P, the transporting driving roller 8 rotates in the rotation direction C and the transporting endless belt 10 moves, that is, rotates in a movement direction E.

The recording mechanism 4 is provided with the recording head 7 which is able to record by discharging ink onto the recording medium P which is supported by the transporting endless belt 10, a carriage which is not shown in the diagram where the recording head 7 is mounted, and a carriage motor 26 (FIG. 2) which moves the carriage back and forth in the width direction B. Here, the width direction B in FIG. 1 is a direction which is orthogonal with regard to the paper surface.

During recording, the recording mechanism 4 records by the recording head 7 being moved back and forth, but the transport mechanism 3 stops transporting the recording medium P while the recording head 7 is moving. In other words, the back and forth movement of the recording head 7 and the transporting of the recording medium P are performed alternately during recording. That is, the transport mechanism 3 intermittently transports the recording medium P during recording to correspond to the back and forth movement of the recording head 7.

The recording mechanism 4 has a configuration where recording is carried out by the recording head 7 being moved back and forth, but the recording mechanism 4 is not limited to a recording mechanism with such a configuration, and may be configured to have a so-called line head which is provided with a nozzle row which discharges ink in the width direction which intersects with the transport direction A.

The cleaning mechanism 15 of the transporting endless belt 10 is provided with the cleaning roller 13, a cleaning liquid tank 14 where a cleaning agent for cleaning the cleaning roller 13 is held, and a cylinder 19 as a pressing section which presses the cleaning roller 13 onto the transporting endless belt 10. Here, it is also possible for the cylinder 19 to not only press the cleaning roller 13 onto the transporting endless belt 10, but to separate the cleaning roller 13 from the transporting endless belt 10.

Figure 2:
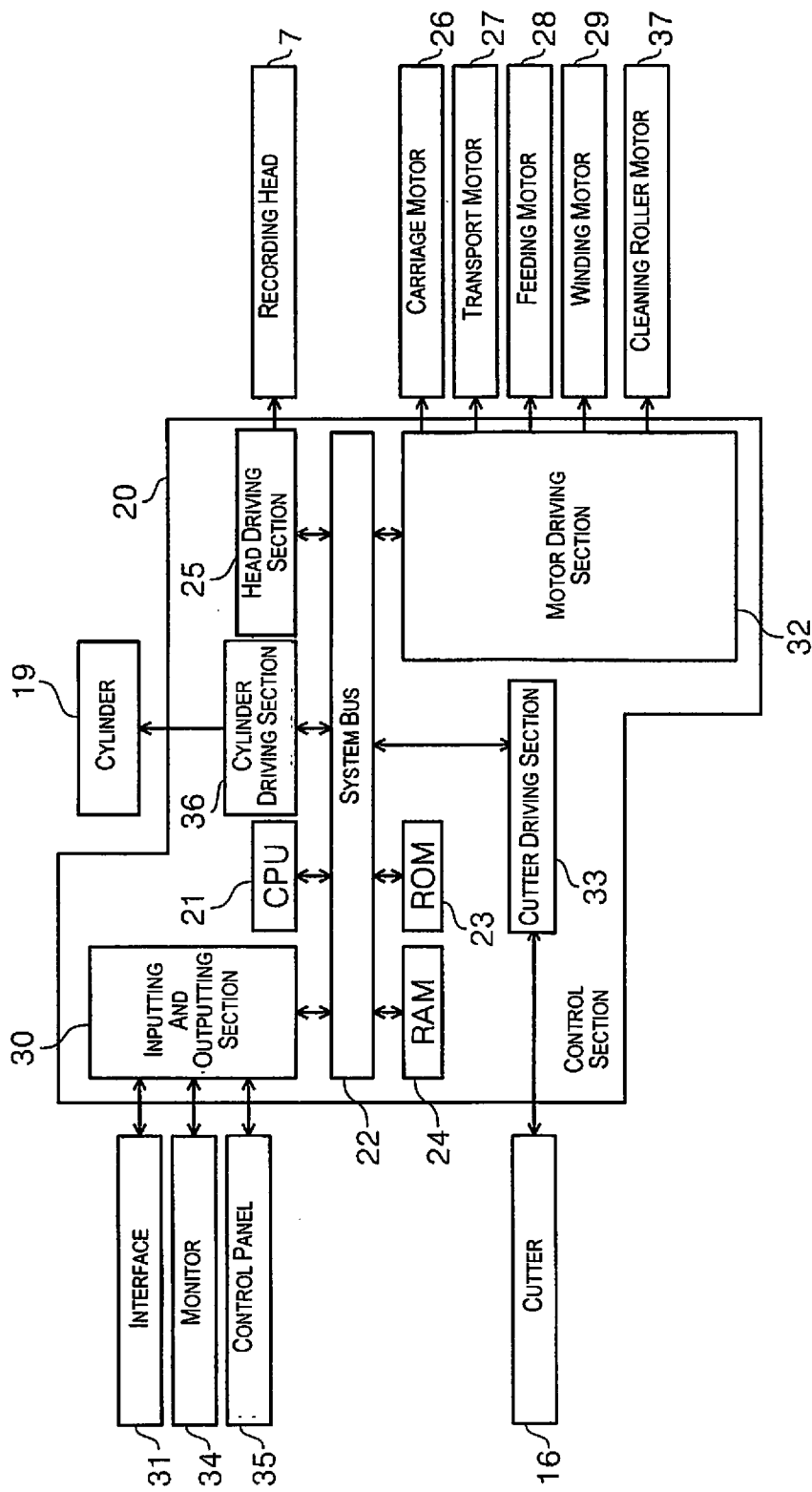
FIG. 2 is a block diagram illustrating the liquid discharging apparatus of embodiment 1 of the present invention.

The cleaning roller 13 is pressed onto the transporting endless belt 10 by the cylinder 19 and the pressing force is controlled by a control section 20 (refer to FIG. 2).

The control section 20 will be described in detail later, but the control section 20 performs control so that the recording medium P is intermittently transported to correspond to the back and forth movement of the recording head 7 by being electrically connected with the cylinder 19, the feeding section 2, the transport mechanism 3, the recording mechanism 4, the cleaning mechanism 15, the winding mechanism 18, and the like.

The length of the cleaning roller 13 in the width direction B is formed to be longer than the length of the transporting endless belt 10 in the same width direction B. Due to this, it is possible to clean the entire transporting endless belt 10 in the width direction B. In addition, since it is possible to clean the transporting endless belt 10 with a wide contact surface, it is possible to effectively suppress uneven cleaning of the transporting endless belt 10.

The winding mechanism 18 is a mechanism which winds the target recording medium P where recording has been carried out and which is transported from the transport mechanism 3 on the winding shaft 17 via a driven roller 11. That is, the winding mechanism 18 winds the target recording medium P as a roll R2 by setting a paper tube or the like for winding on the winding shaft 17 and wrapping the target recording medium P around the paper tube or the like.

Then, the ink jet recording apparatus 1 of the present embodiment is configured such that, when the total length of the transporting endless belt 10 is L1, the intermittent transport distance of the transporting endless belt 10 is L2, and the contact length of the cleaning roller 13 with the transporting endless belt 10 in the transport direction A is L3, the contact length L3 with the transporting endless belt 10 is longer than the intermittent transport distance L2, and the total length L1 of the transporting endless belt 10 has a non-integer multiple relationship with the intermittent transport distance L2.

Here, the "total length of the transporting endless belt" in the present specification has the meaning of the length of a portion of the adhesive support surface over one revolution along the direction of transport.

In addition, the "contact length" in the present specification has the meaning of the length of a portion, where the cleaning roller comes into contact with the transporting endless belt when the cleaning roller cleans the transporting endless belt, in the transport direction.

In addition, the "adhesive support surface" in the present specification has the meaning of a support surface where an adhesive, which holds a recording medium by bonding such that peeling off is possible, is attached to a surface which supports the recording medium.

In addition, the "medium" in the present specification is used with a meaning where a recording medium such as paper, fabric, or the like where recording is performed by discharging ink is representative, but which includes all media which are a target for discharging, other than the paper, fabric, or the like, where a liquid is discharged with a desired object which is different to recording. In detail, examples include paper, fabric, plastic, metal, glass, wood, ceramics, leather, and the like.

Next, an electrical configuration of the ink jet recording apparatus 1 of the present embodiment will be described based on FIG. 2.

The control section 20 is provided with a CPU 21 which is in charge of controlling the entirety of the ink jet recording apparatus 1. The CPU 21 is connected via a system bus 22 with a ROM 23, which stores various types of control programs and the like which are executed by the CPU 21, and a RAM 24 which is able to temporarily store data. In addition, the CPU 21 is connected via the system bus 22 with a head driving section 25 for driving the recording head 7.

In addition, the CPU 21 is connected via the system bus 22 with a motor driving section 32 for driving the carriage motor 26, a transport motor 27, a feeding motor 28, a winding motor 29, and a cleaning roller motor 37.

Here, the carriage motor 26 is a motor for moving a carriage (which is not shown in the diagram) where the recording head 7 is mounted. In addition, the transport motor 27 is a motor for driving the transporting driving roller 8. In addition, the feeding motor 28 is a rotating mechanism for the rotating shaft 5 and a motor which drives the rotating shaft 5 in order to send out the target recording medium P to the transport mechanism 3. The winding motor 29 is a driving motor for rotating the winding shaft 17. Then, the cleaning roller motor 37 is a motor for rotating the cleaning roller 13.

In addition, the CPU 21 is connected via the system bus 22 with a cutter driving section 33 which drives the cutter 16 so as to cut the target recording medium P. In addition, the CPU 21 is connected via the system bus 22 with a cylinder driving section 36.

Furthermore, the CPU 21 is connected with an inputting and outputting section 30. The inputting and outputting section 30 is connected with a monitor 34 and a control panel 35, which are provided in the ink jet recording apparatus 1, and an interface 31 for inputting recording data or the like from an external apparatus such as a personal computer (PC) or the like, in order to send and receive data and signals.

Description of Operation

The operations in the present embodiment will be described based on FIGS. 3A to 3C.

Figure 3A:
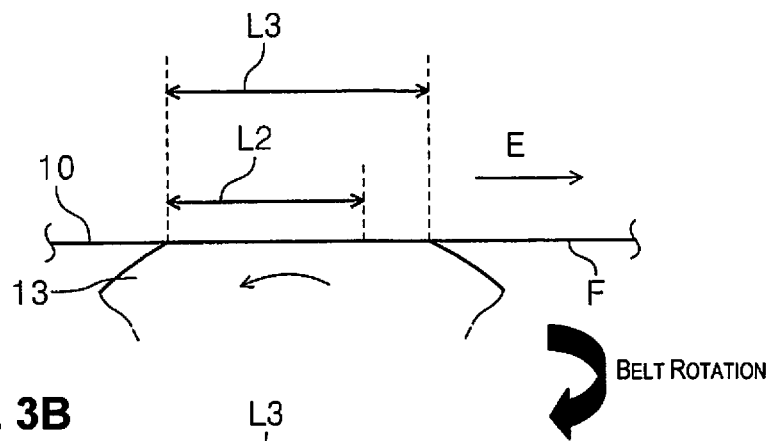
FIGS. 3A to 3C are explanatory operation diagrams of embodiment 1 of the present invention.

In FIG. 3A, the adhesive support surface F of the transporting endless belt 10 is brought into contact over the contact length L3 in the direction of transport by the transporting endless belt 10. In the same diagram, the reference numeral L2 indicates the intermittent transport distance of the transporting endless belt 10, that is, the feeding amount per cycle. The contact length L3 is longer than the intermittent transport distance L2.

Figure 3B:
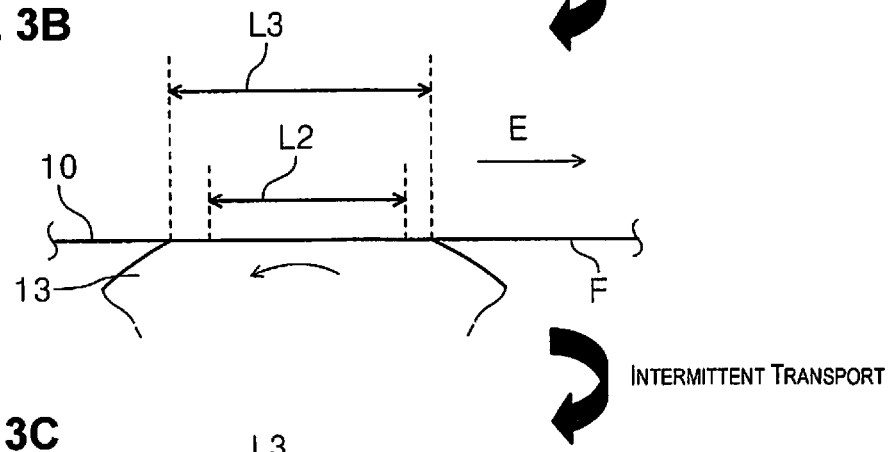

FIG. 3B illustrates a state where the transporting endless belt 10 rotates once (moving the total length) from the position in FIG. 3A. Since the total length L1 of the transporting endless belt 10 is configured with a non-integer multiple relationship with regard to the intermittent transport distance L2, the location where the adhesive support surface F of the transporting endless belt 10 comes into contact with the cleaning roller 13 due to a single rotation is shifted to be different to the state of FIG. 3A.

Figure 3C:
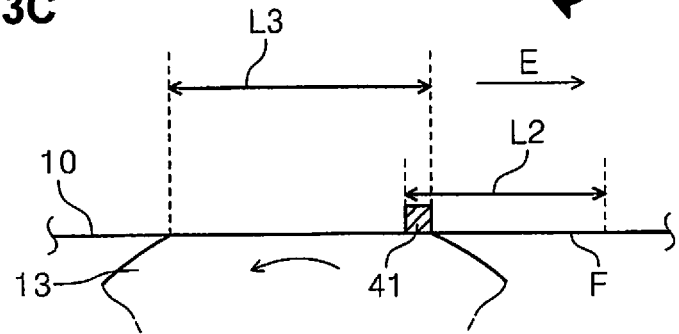

FIG. 3C illustrates a state where intermittent transport is performed once from the state of FIG. 3B, and the region which is indicated by reference numeral 41 is equivalent to a portion which is not able to pass through the range of the contact length L3 in a single intermittent transporting. Cleaning of the portion which corresponds to the region 41 of the adhesive support surface F of the transporting endless belt 10 is performed twice when passing through the cleaning region (the range of the contact length L3) using the cleaning roller 13. However, the position of the region 41 shifts in each time of intermittent transporting, and the length in the transport direction A also changes in each time of intermittent transporting.

As is understood from the description above based on FIGS. 3A to 3C, since the total length L1 of the transporting endless belt 10 is a non-integer multiple of the intermittent transport distance L2 according to the present embodiment, it is possible to disperse locations with a high frequency of cleaning on the adhesive support surface F over the entire circumference of the transporting endless belt 10.

That is, in the ink jet recording apparatus 1 with a configuration where the transporting endless belt 10 which has the adhesive support surface F is cleaned by the cleaning roller 13, it is possible to suppress a high frequency of cleaning at specific locations on the adhesive support surface F. Accordingly, the frequency of re-applying the adhesive on the adhesive support surface F is reduced and it is possible to reduce the burden on the user.

In addition, there are no locations with cleaning omissions with regard to the target cleaning surface due to the contact length L3 being formed to be longer than the intermittent transport distance L2.

Figure 4:
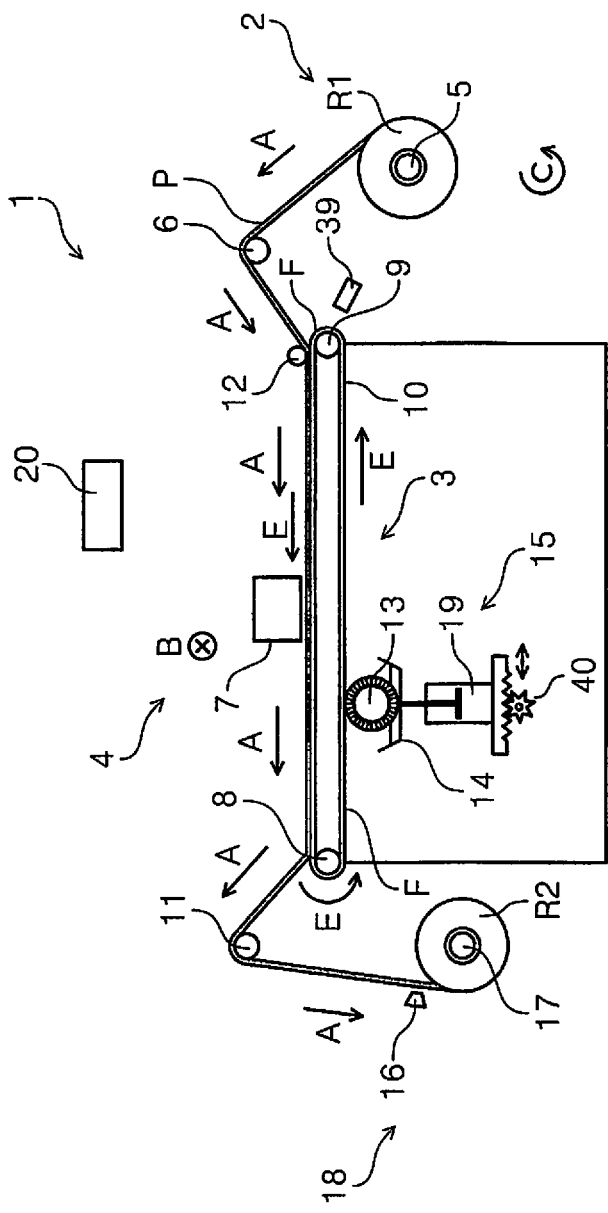
FIG. 4 is a schematic side surface diagram illustrating a liquid discharging apparatus of embodiment 2 of the present invention.
Figure 5:
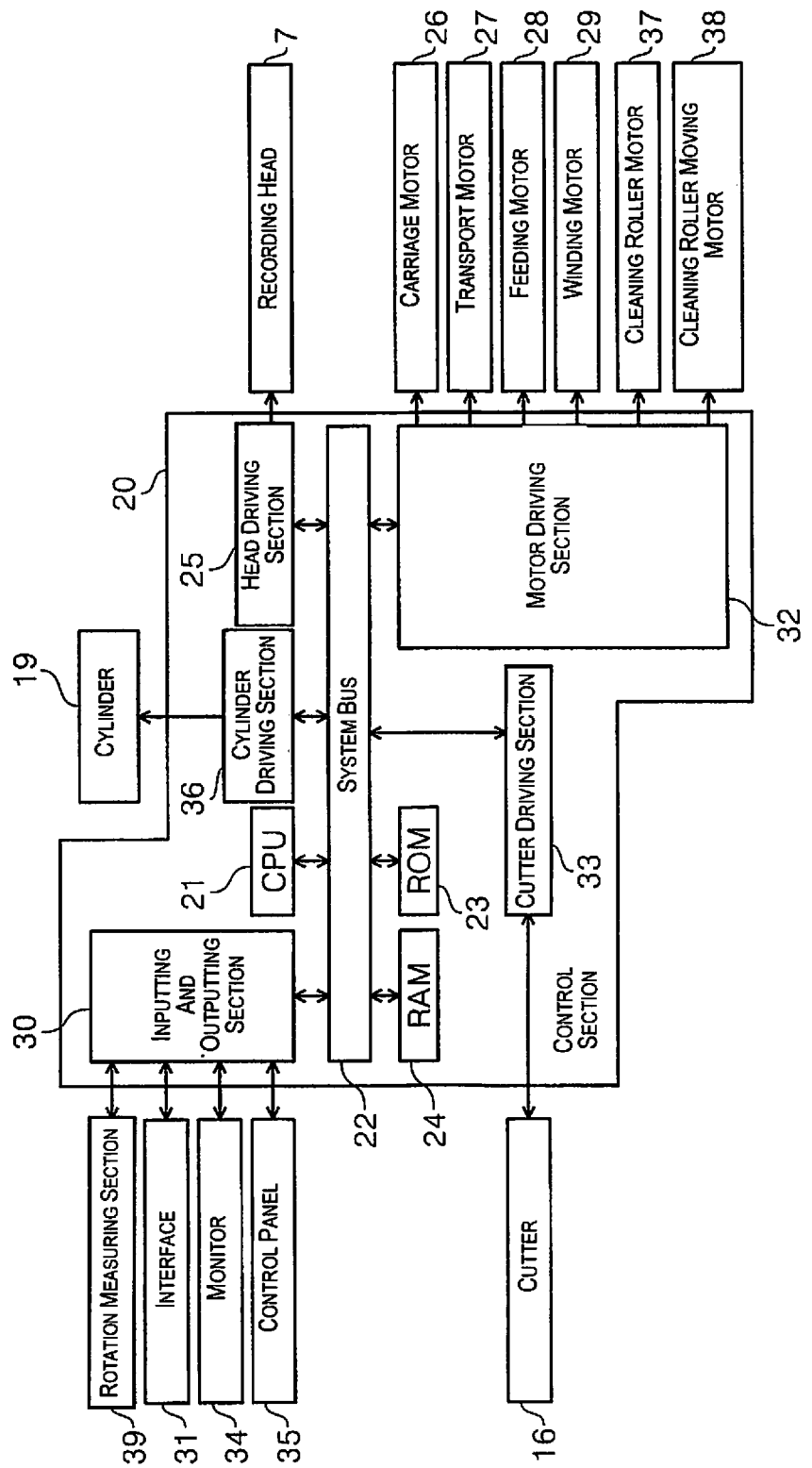
FIG. 5 is a block diagram illustrating the liquid discharging apparatus of embodiment 2 of the present invention.

Embodiment 2 (FIG. 4 to FIG. 5)

FIG. 4 is a schematic side surface diagram of the ink jet recording apparatus 1 according to embodiment 2 of the present invention.

In the present embodiment, when the intermittent transport distance of the transporting endless belt 10 is L2, and the contact length of the cleaning roller 13 with the transporting endless belt 10 in the transport direction A is L3, the contact length L3 is formed to be longer than the intermittent transport distance L2. In addition, the cleaning mechanism 15 is configured to be able to displace the position of the cleaning roller 13 which comes into contact with the transporting endless belt 10 in the transport direction A.

Here, the amount of displacement when the contact position of the cleaning roller 13 is displaced may be appropriately set to a range where there are no locations with cleaning omissions due to the cleaning roller 13. In addition, the amount of displacement may be changed each time, or may be changed over a predetermined cycle.

As a moving structure 40 which is able to displace the position of the cleaning roller 13 which comes into contact with the transporting endless belt 10 in the transport direction A, a rack and pinion is used in the present embodiment, but it is possible to adopt another known moving structure (a belt format, a rail format, or the like) as appropriate without being limited to a rack and pinion. Driving of the moving structure (the rack and pinion) is performed by a cleaning roller moving motor 38 (FIG. 5).

In addition, FIG. 4 illustrates a structure where displacing of the cleaning roller 13 is performed by the entirety of the cleaning mechanism 15 being moved using the rack and pinion, but it is possible to use a structure where only a portion of the cleaning mechanism 15, for example, a portion of the cleaning roller 13 is moved and displaced.

In the present embodiment, a rotation measuring section 39 is provided which measures the rotations of the transporting endless belt 10. The rotation measuring section 39 is a structure which directly measures the number of rotations by optically reading a mark (which is not shown in the diagram) which is provided on the transporting endless belt 10, but the rotation measuring section 39 is not limited to this structure.

Since the other portions of the configuration are the same as that of embodiment 1 shown in FIG. 1, the same reference numerals are given to the same portions and description of such portions is omitted.

Next, an electrical configuration of the ink jet recording apparatus 1 of the present embodiment will be described based on FIG. 5.

The CPU 21 is connected via the system bus 22 with the motor driving section 32 for driving the cleaning roller moving motor 38 in addition to the carriage motor 26, the transport motor 27, the feeding motor 28, the winding motor 29, and the cleaning roller motor 37.

Here, the cleaning roller moving motor 38 is a motor which drives the moving structure (the rack and pinion) 40.

In addition, the inputting and outputting section 30 which is connected with the CPU 21 is connected with the rotation measuring section 39 in addition to the monitor 34, the control panel 35, and the interface 31, in order to send and receive data and signals.

Since the other portions of the electrical configuration are the same as that of the embodiment 1 shown in FIG. 2, the same reference numerals are given to the same portions and description of such portions is omitted.

Description of Operation

According to the present embodiment, since the contact length L3 is longer than the intermittent transport distance L2 and it is possible to displace the position of the cleaning roller 13 which comes into contact with the transporting endless belt 10 in the transport direction A, there are no locations with cleaning omissions and it is possible to disperse locations with a high frequency of cleaning over the entire circumference of the transporting endless belt 10 by performing the displacement. That is, in the ink jet recording apparatus 1 with a configuration where the transporting endless belt 10 which has the adhesive support surface F is cleaned by the cleaning roller 13, it is possible to suppress a high frequency of cleaning at specific locations on the adhesive support surface F. Accordingly, the frequency of re-applying the adhesive on the adhesive support surface F is reduced and it is possible to reduce the burden on the user.

In addition, there is a configuration in the present embodiment where the position of the cleaning roller 13 which comes into contact with the transporting endless belt 10 is automatically displaced via the moving structure (the rack and pinion) 40 based on the number of rotations which is measured by the rotation measuring section 39, that is, rotation information for the transporting endless belt 10.

Since the rotation information such as the number of rotations of the transporting endless belt 10 has a correlation relationship with a high frequency of cleaning, using the rotation information is effective in achieving the object of the present invention. For example, it is possible to effectively perform the contact position displacement operation by setting the displacement operation to be performed every 1 rotation, every 10 rotations, every 50 rotations, every 100 rotations, or the like of the transporting endless belt 10 and by further having a configuration where it is possible for the setting of the number of rotations of the transporting endless belt 10 to be changed. In addition, it is possible to perform displacement operations while eliminating wasteful displacement operations.

Here, the "rotation information" is directly obtained as the number of rotations by setting up the rotation measuring section 39 which measures the rotations of the transporting endless belt 10, but the "rotation information" may be indirectly determined by calculating the number of rotations of the transport motor 27 which rotates the transporting endless belt 10.

Embodiment 3

Embodiment 3 is a modified example of embodiment 2.

In the present embodiment, instead of or in addition to the rotation measuring section 39, a timing section (which is not shown in the diagram) is provided which measures the elapsing of time in a state where the transporting endless belt 10 is being rotated. There is a configuration where displacement of the contact position is executed when the elapsing of time which is measured by the timing section exceeds a set time. In the present embodiment, there is a configuration where the contact position is automatically displaced via the moving structure (rack and pinion) 40 by the control section 20 receiving information on the elapsing of time.

Since the elapsing of time also has a correlation relationship with a high frequency of cleaning, using the information on the elapsing of time is effective in achieving the object of the present invention.

Determining that the "set time" has elapsed according to the timing section is carried out with high precision by measuring the elapsing of time using the timing section in a state where the transporting endless belt 10 is being rotated, but the determining may be carried out based on the elapsing of time from the time of powering on of the ink jet recording apparatus.

According to the present embodiment, since the position of the cleaning roller 13 which comes into contact with the transporting endless belt 10 is displaced with each elapsing of the set time, it is possible to effectively perform displacement operations while eliminating wasteful displacement operations by, for example, setting the displacement to be performed every 1 hour, every 10 hours, every day, 2 days, every week, or the like and by further having a configuration where it is possible to set the set time of the displacement operations to be changed.

Embodiment 4

Embodiment 4 is also a modified example of embodiment 2.

In the present embodiment, instead of or in addition to the rotation measuring section 39, there is a configuration where the position where the cleaning roller 13 comes into contact with the transporting endless belt 10 is displaced due to inputting of displacement instructions from the user. Here, the inputting of displacement instructions from the user is performed from the control panel 35. In the present embodiment, there is a configuration where the contact position is automatically displaced via the moving structure (the rack and pinion) 40 by the control section 20 receiving the inputting of displacement instructions from the user.

According to the present embodiment, since the contact position is displaced according to the inputting of the displacement instructions from the user, it is possible to carry out precision displacement which is not uniform. In addition, it is possible to simplify the structure for executing the displacement.

Here, with a structure where the moving structure 40 is moved manually rather than electrically, when it is determined that the user performs displacement, the displacement may be carried out by driving the moving structure 40 manually (by a manual operation by the user). Due to this, it is possible to simplify the structure for realizing the displacement.

Figure 6A:
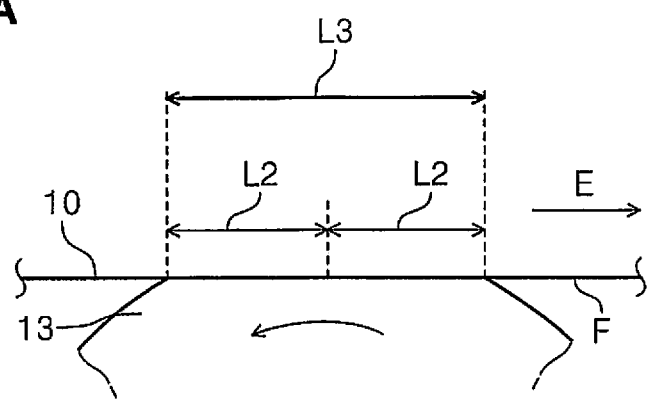
FIGS. 6A and 6B are explanatory operation diagrams of embodiment 5 of the present invention.
Figure 6B:
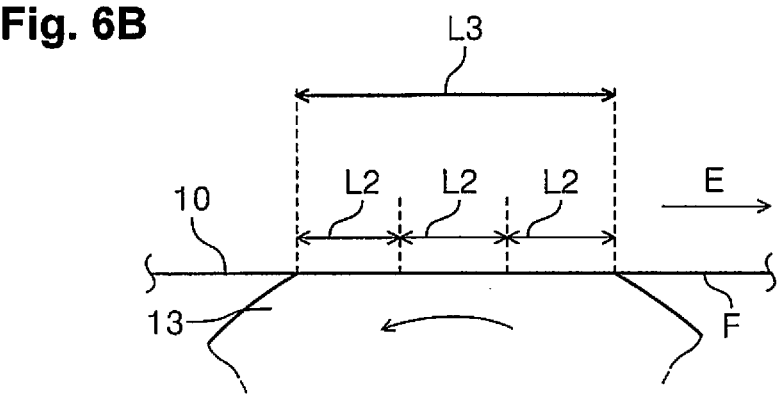

Embodiment 5 (FIGS. 6A and 6B)

FIGS. 6A and 6B are explanatory operation diagrams of the ink jet recording apparatus 1 according to embodiment 5 of the present invention.

In the present embodiment, when the total length of the transporting endless belt 10 is L1, the intermittent transport distance of the transporting endless belt 10 is L2, and the contact length of the cleaning roller 13 with the transporting endless belt 10 in the transport direction A is L3, the contact length L3 is longer than the intermittent transport distance L2, and the contact length L3 is an integer multiple of the intermittent transport distance L2.

FIG. 6A illustrates a case where the contact length L3 is double the intermittent transport distance L2, and FIG. 6B illustrates a case where the contact length L3 is three times the intermittent transport distance L2. Since the other portions of the configuration are the same as the configuration shown in FIGS. 3A to 3C, the same reference numerals are given to the same portions and description of such portions is omitted.

Description of Operation

According to the present embodiment, since the contact length L3 is longer than the intermittent transport distance L2, and the contact length L3 is an integer multiple of the intermittent transport distance L2, there are no locations with cleaning omissions and it is possible to disperse locations with a high frequency of cleaning over the entire circumference of the transporting endless belt 10 due to the integer multiple relationship.

That is, in an ink jet recording apparatus with a configuration where the transporting endless belt 10 which has the adhesive support surface F is cleaned by the cleaning roller 13, it is possible to suppress a high frequency of cleaning at specific locations on the adhesive support surface F. Accordingly, the frequency of re-applying the adhesive on the adhesive support surface F is reduced and it is possible to reduce the burden on the user.

Figure 7:
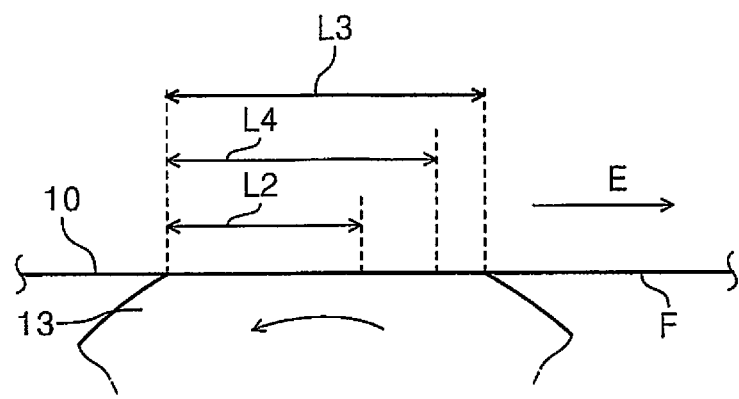
FIG. 7 is an explanatory operation diagram of embodiment 6 of the present invention.
Figure 8:
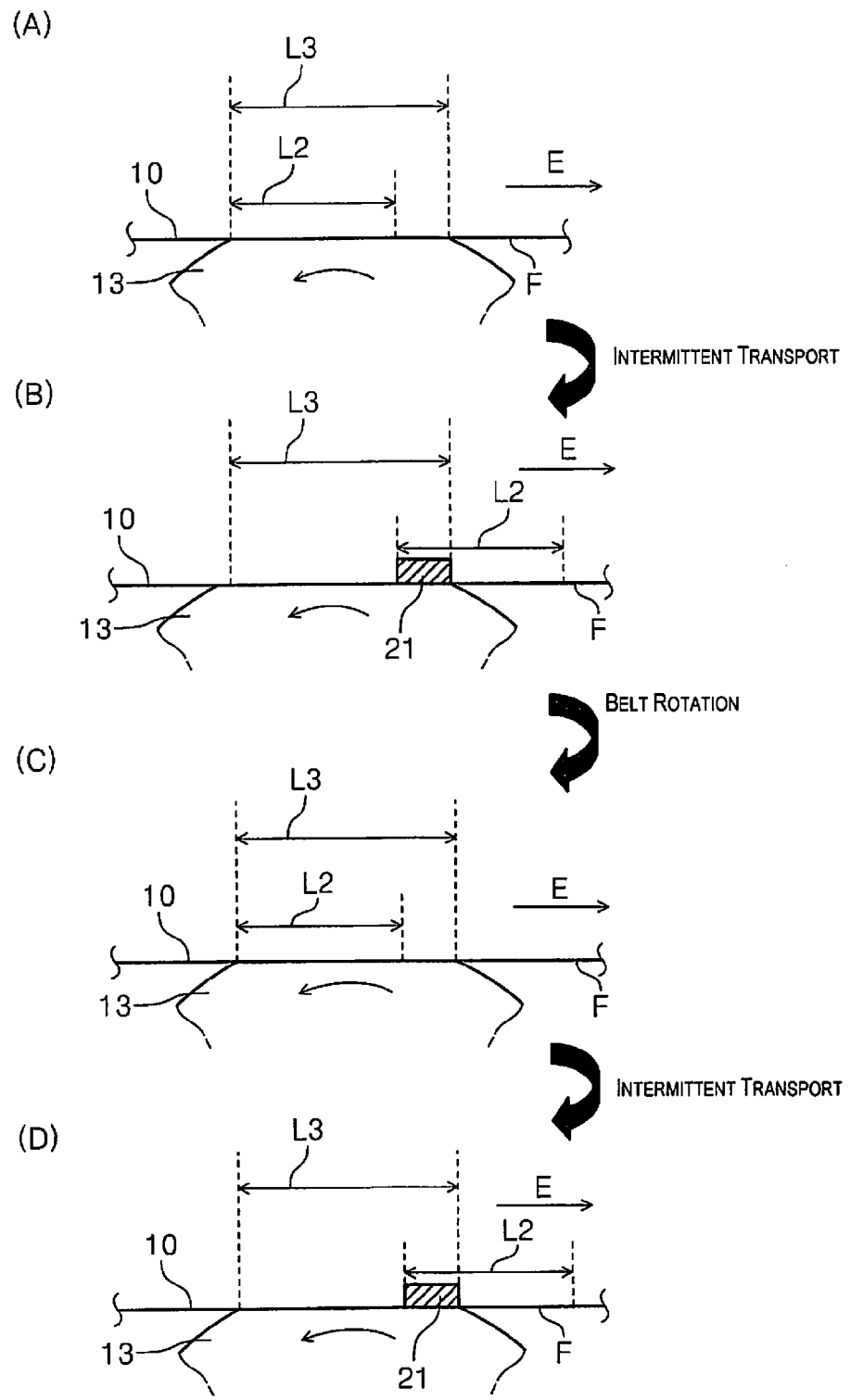
FIG. 8 includes explanatory diagrams (A) to (D) of problems with the structure of the prior art.

Embodiment 6 (FIG. 7)

Embodiment 6 is an embodiment where the following configuration is added to each of the embodiments described above.

As shown in FIG. 7, the contact length L3 of a portion where the cleaning roller 13 comes into contact with the transporting endless belt 10 is longer than a length L4 of the nozzle row of the recording head 7 in the transport direction A.

According to the present embodiment, it is possible to disperse locations with a high frequency of cleaning over the entire circumference of the transporting endless belt 10 by easily dealing with various recording execution modes (liquid discharging modes).

Embodiment 7

Embodiment 7 is an embodiment where the following configuration is added to each of the embodiments described above.

The contact length L3 of a portion where the cleaning roller 13 comes into contact with the transporting endless belt 10 is variable. There is a configuration where this variability is performed by the cylinder 19 pressing the cleaning roller 13 to the transporting endless belt 10.

According to the present embodiment, even when, for example, the intermittent transport distance L2 of the transporting endless belt 10 changes, it is possible to easily deal with the changes and it is possible to easily maintain the configuration where the contact length L3 is longer than the intermittent transport distance L2.

Embodiment 8

Embodiment 8 is an embodiment where the following configuration is added to embodiment 1.

The contact length L3 of a portion where the cleaning roller 13 comes into contact with the transporting endless belt 10 is an integer multiple of the intermittent transport distance L2.

According to the present embodiment, since the contact length L3 is an integer multiple of the intermittent transport distance L2, it is easier to disperse locations with a high frequency of cleaning over the entire circumference of the transporting endless belt 10 in addition to the operations and effects of embodiment 1.

Embodiment 9

The present embodiment 9 is an embodiment where the following configuration is added to embodiment 2.

The contact length L3 of a portion where the cleaning roller 13 comes into contact with the transporting endless belt 10 is an integer multiple of the intermittent transport distance L2.

According to the present embodiment, since the contact length L3 is an integer multiple of the intermittent transport distance L2, it is easier to disperse locations with a high frequency of cleaning over the entire circumference of the transporting endless belt 10 in addition to the operations and effects of embodiment 2.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A liquid discharging apparatus comprising:
    a transporting endless belt having an adhesive support surface, and configured and arranged to intermittently transport a medium by supporting the medium on the adhesive support surface;
    a discharging head configured and arranged to discharge a liquid onto the medium supported by the transporting endless belt;
    a cleaning mechanism having a cleaning roller configured and arranged to clean the transporting endless belt by coming into contact with the transporting endless belt; and,
    a controller configured and arranged to control the transporting endless belt so that the medium is intermittently transported, and to control operation of the cleaning mechanism,
    wherein, when a total length of the transporting endless belt is L1, an intermittent transport distance of the transporting endless belt is L2, and a contact length of the cleaning roller with the transporting endless belt in a transport direction is L3, the controller being configured to control the transporting endless belt and the cleaning mechanism so that L3 is longer than L2, and L1 is a non-integer multiple of L2.

2. The liquid discharging apparatus according to claim 1, wherein
    L3 is an integer multiple of L2.

3. The liquid discharging apparatus according to claim 1, wherein
    L3 is longer than a length L4 of a nozzle row of the discharging head in the transport direction.

4. A liquid discharging apparatus according to claim 1, wherein
    L3 is variable.

5. A liquid discharging apparatus comprising:
    a transporting endless belt having an adhesive support surface, and configured and arranged to intermittently transport a medium by supporting the medium on the adhesive support surface;
    a discharging head configured and arranged to discharge a liquid onto the medium supported by the transporting endless belt; and
    a cleaning mechanism having a cleaning roller configured and arranged to clean the transporting endless belt by coming into contact with the transporting endless belt,
    wherein, when an intermittent transport distance of the transporting endless belt is L2, and a contact length of the cleaning roller with the transporting endless belt in a transport direction is L3, L3 is longer than L2, and the cleaning mechanism is configured and arranged to displace a contact position of the cleaning roller which comes into contact with the transporting endless belt in the transport direction.

6. The liquid discharging apparatus according to claim 5, wherein

L3 is an integer multiple of L2.

7. The liquid discharging apparatus according to claim 5, wherein the cleaning mechanism is configured and arranged to displace the contact position based on transporting endless belt rotation information.

8. The liquid discharging apparatus according to 5, wherein the cleaning mechanism is configured and arranged to displace the contact position with each elapsing of a set time.

9. The liquid discharging apparatus according to claim 5, wherein the cleaning mechanism is configured and arranged to displace the contact position according to inputting of displacement instructions from a user or by a manual operation by the user.

10. The liquid discharging apparatus according to claim 5, wherein

L3 is longer than a length L4 of a nozzle row of the discharging head in the transport direction.

11. A liquid discharging apparatus according to any claim 5, wherein

L3 is variable.

12. A liquid discharging apparatus comprising:

a transporting endless belt having an adhesive support surface, and configured and arranged to intermittently transport a medium by supporting the medium on the adhesive support surface;

a discharging head configured and arranged to discharge a liquid onto the medium supported by the transporting endless belt;

a cleaning mechanism having a cleaning roller configured and arranged to clean the transporting endless belt by coming into contact with the transporting endless belt; and a controller configured and arranged to control the transporting endless belt so that the medium is intermittently transported, and to control operation of the cleaning mechanism, wherein, when a total length of the transporting endless belt is L1, an intermittent transport distance of the transporting endless belt is L2, and a contact length of the cleaning roller with the transporting endless belt in a transport direction is L3, the controller being configured to control the transporting endless belt and the cleaning mechanism so that L3 is longer than L2, and L3 is an integer multiple of L2.

13. The liquid discharging apparatus according to claim 12, wherein

L3 is longer than a length L4 of a nozzle row of the discharging head in the transport direction.

14. A liquid discharging apparatus according to claim 12, wherein

L3 is variable.

* * * * *